Feb. 16, 1943.   W. B. O'NEAL ET AL   2,311,076
MEASUREMENT APPARATUS
Filed Nov. 5, 1940   2 Sheets-Sheet 1
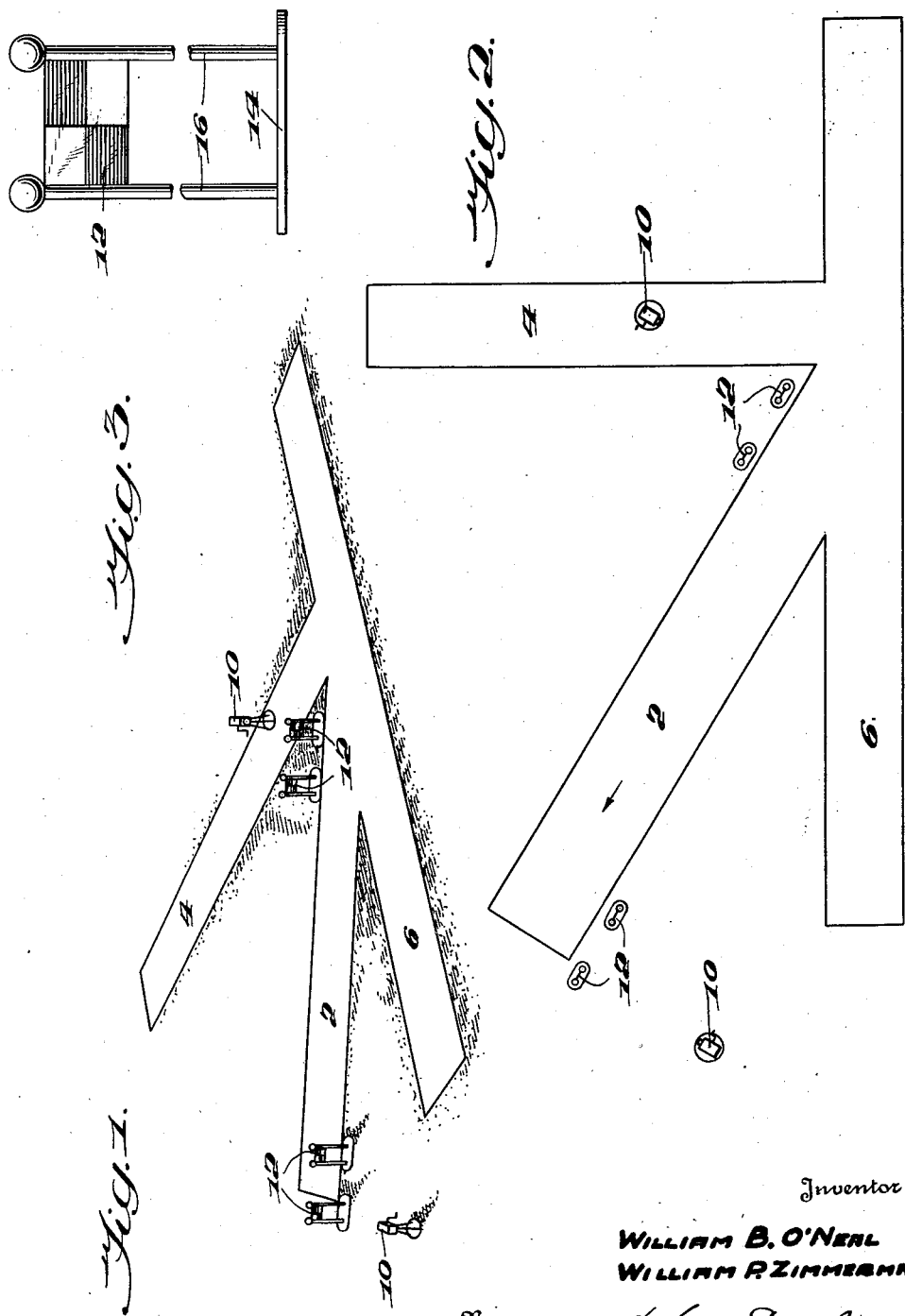
Inventor
WILLIAM B. O'NEAL
WILLIAM R. ZIMMERMAN
By
Attorney

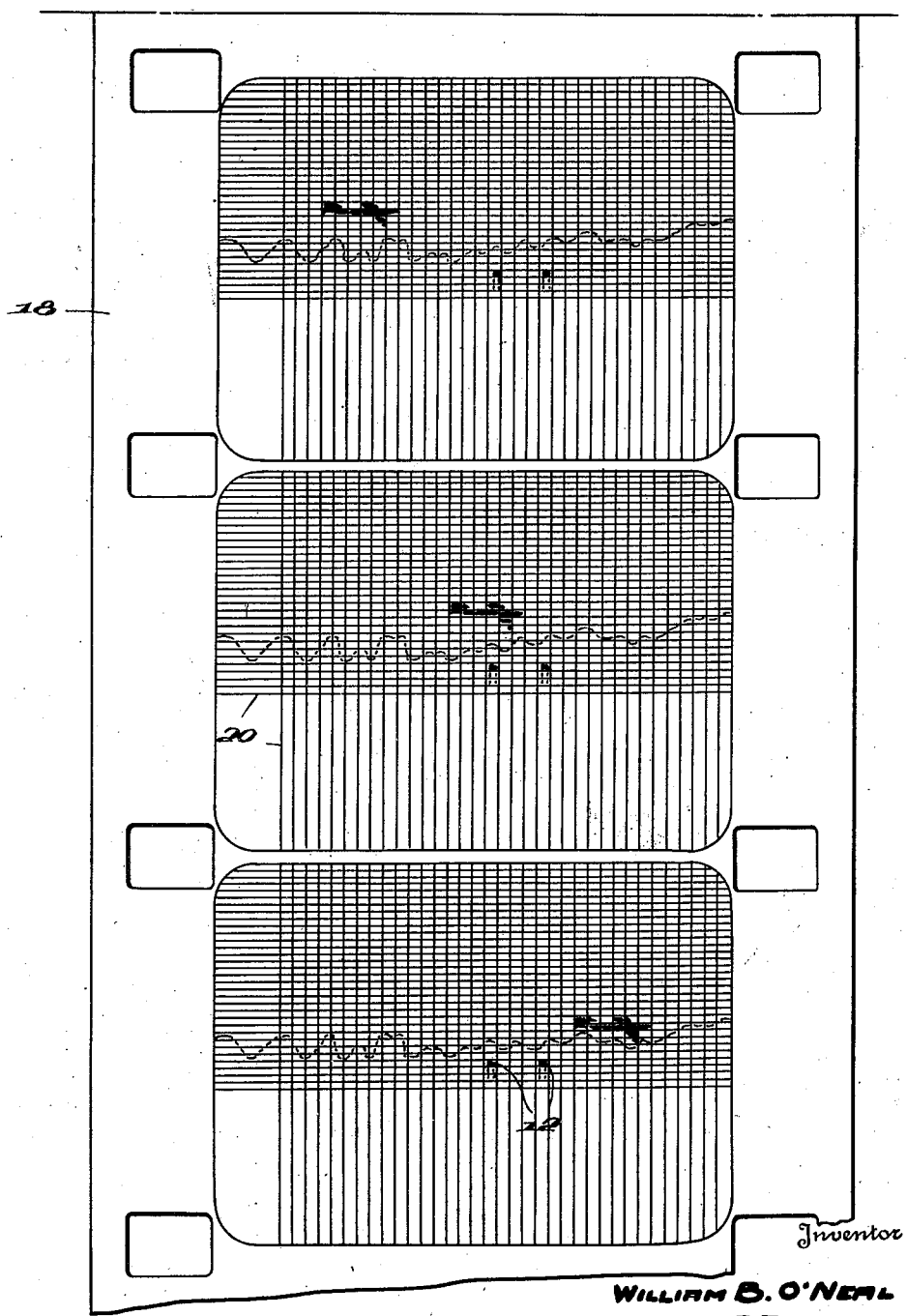

Patented Feb. 16, 1943

2,311,076

UNITED STATES PATENT OFFICE 2,311,076

MEASUREMENT APPARATUS

William B. O'Neal and William P. Zimmerman, Baltimore, Md., assignors to The Glenn L. Martin Company, Baltimore, Md.

Application November 5, 1940, Serial No. 364,418

2 Claims. (Cl. 33—64)

The invention relates to a system and method for measuring the ground maneuvers, that is the take-offs and landings of aircraft, and to photographic material for use in such a process and a method of preparing the same.

Two procedures have heretofore been known for this purpose. One of these is a complex photographic process requiring special and expensive cameras, and extremely skillful operation. The other involves rapid observations by at least five observers with theodolites, which increases the ground crew and is likely to be inaccurate because of errors on the part of the observers.

The primary object of the present invention is to provide an accurate, yet simple method of measuring landings and take-offs of airplanes.

A further object is to provide a method of this type which does not require special equipment, but which can be used with an ordinary motion picture camera and simple reference flags, with a special film which can be easily prepared by any ordinary photographic laboratory.

Still another object of the invention is to provide a procedure of this type which can be operated by fewer observers, and these less expert, than the present theodolite process.

Another object of the invention is to provide a measuring process which utilizes simple photographic principles.

Still a further object is to produce photographic records of the landing or take-off which can be readily and accurately analyzed, and which can be easily compared with other similar records.

An additional object of the invention is to provide a system applied on an airport or landing field for carrying out the process of the invention.

Still a further object of the invention is to provide a novel photographic sensitive element, preferably in the form of a long strip film of the type of a motion picture film, for use in carrying out the process, so that successive frames of such a film may be observed for the measurement of distances.

Further objects and advantages of the invention will appear more fully from the following description, particularly when taken in conjunction with the accompanying drawings which form a part thereof.

In the drawings:

Fig. 1 shows in perspective a landing field provided with a system embodying the preferred equipment arranged for carrying out the process;

Fig. 2 is a top plan view thereof;

Fig. 3 shows in elevation one of the flags; and

Fig. 4 shows a portion of the special film used in the process, after exposure.

Figs. 1 and 2 show a typical landing field having a plurality of runways at angles to each other, such as 2, 4 and 6. Assuming that planes are to take off and land on runway 2, because of the existing wind conditions, two systems are set up. If the wind is blowing generally in the direction of the arrow, Fig. 2, the left-hand system is used primarily for landings and the right-hand system for take-offs.

Each system includes a camera capable of taking a rapid series of exposures, preferably a motion picture camera, indicated at 10. This camera is fitted with a conventional wide-angle lens. It is so arranged as to remain stationary, with its lens axis at a substantial angle, preferably a right angle, to the length of runway 2.

Arranged in the field of the camera 10, and preferably between the camera and the runway and close to the edge of the runway, are two markers or reference members such as flags 12, shown in detail in Fig. 3. Each flag has a base 14 with two uprights 16 of predetermined height between which the flag is mounted. One of the flags is preferably arranged in the axis of the camera, and the other in a line passing through the first flag and perpendicular to such axis. In any event, the camera and flags form a triangle.

In the system used for carrying out the method, the camera was arranged at 500 feet from the center of the runway, and the flags 400 feet from the camera and 80 feet apart.

The camera is charged with a specially prepared film 18, shown in Fig. 4. This film, which is preferably of the motion picture type, is prepared by photographing a series of crossed white cords on a black background, thus producing on the film a grid 20 composed of white lines (shown in black on the drawings). This film is not developed after such exposure, but is used in the camera so as to superpose the pictures to be taken on this grid.

The camera loaded with this film is now arranged, for example for a take-off, at the right-hand position. The plane starts along the runway from the left end. A series of observers are stationed along the runway, and the camera is started. The observers mark the point at which the take-off begins, and the camera pictures the path of the plane as long as it is within the field of the lens. The distance from the point of take-off to the flags is then measured, and the film is developed.

Because of the known distance from the camera to the flags and between the flags, it is easy to determine the vertical and horizontal distances represented by each of the grid spaces at the center of the runway. By counting the number of spaces from either flag to the airplane in any picture, its height with respect to the ground at any distance from the take-off point can be determined. By selecting a few pictures equally spaced on the film, a graph representing the path of the plane can easily be drawn.

The same procedure is followed in landings, Fig. 4 showing photographs taken during a landing operation. Here in the example shown in the drawings the left-hand camera is used, and the landing point is determined and its distance from the left-hand flags is measured.

Where a number of tests are to be made, it is more convenient to set up a marker after each take-off and landing, and to measure the distances from each of these to the flags at the same time.

As is obvious from Fig. 4, it is not necessary that the grid cover the entire area of the film frame, as long as it covers that portion in which the flags and the aircraft will appear.

The term "contact point" as used in the claims is intended to designate the point at which the airplane first touches the ground in a landing or leaves it in a take-off.

While we have described herein some embodiments of our invention, we wish it to be understood that we do not intend to limit ourselves thereby except within the scope of the appended claims.

We claim:

1. A method of determining landing characteristics of an airplane which comprises pre-exposing a photographic film, to impress thereon the latent image of a grid, re-exposing the film by taking on said film a succession of pictures of the airplane landing, in a camera capable of making exposures at timed intervals, and processing the film to develop the superposed images.

2. A method of determining landing characteristics of an airplane which comprises pre-exposing a photographic film to impress thereon the latent image of a grid, taking on said film a series of pictures of an airplane landing at timed intervals, processing the film to develop the superposed images.

WILLIAM B. O'NEAL.
WILLIAM P. ZIMMERMAN.